United States Patent
Maruta

(10) Patent No.: US 8,301,172 B2
(45) Date of Patent: Oct. 30, 2012

(54) MOBILE COMMUNICATION SYSTEM AND METHOD FOR ESTIMATING MOVING SPEED OF MOBILE TERMINAL

(75) Inventor: Yasushi Maruta, Tokyo (JP)

(73) Assignee: NEC Corporation, Tokyo (JP)

( * ) Notice: Subject to any disclaimer, the term of this patent is extended or adjusted under 35 U.S.C. 154(b) by 430 days.

(21) Appl. No.: 12/281,657

(22) PCT Filed: Feb. 9, 2007

(86) PCT No.: PCT/JP2007/052321
§ 371 (c)(1),
(2), (4) Date: Sep. 4, 2008

(87) PCT Pub. No.: WO2007/102294
PCT Pub. Date: Sep. 13, 2007

(65) Prior Publication Data
US 2009/0191861 A1    Jul. 30, 2009

(30) Foreign Application Priority Data
Mar. 9, 2006    (JP) .................................. 2006-064113

(51) Int. Cl.
*H04W 24/00*    (2009.01)
(52) U.S. Cl. .................. 455/456.6; 455/404.2; 455/423; 455/424; 455/456.1; 375/240.28; 375/293; 375/356
(58) Field of Classification Search .................. 455/438, 455/441, 350, 208, 67.1, 442, 456.6, 404.2, 455/423, 424, 456.1; 375/240.28, 293, 356
See application file for complete search history.

(56) References Cited

U.S. PATENT DOCUMENTS
6,370,357 B1 * 4/2002 Xiao et al. .................. 455/67.11
2001/0041536 A1 * 11/2001 Hasegawa .................... 455/67.1

FOREIGN PATENT DOCUMENTS
| GB | 2347831 A | 9/2000 |
|---|---|---|
| JP | 2000165341 A | 6/2000 |
| JP | 2001298395 A | 10/2001 |
| JP | 2002016481 A | 1/2002 |
| JP | 2002217783 A | 8/2002 |
| JP | 2003158779 A | 5/2003 |
| JP | 2005159655 A | 6/2005 |

OTHER PUBLICATIONS

International Search Report for PCT/JP2007/052321 mailed May 15, 2007.
International Preliminary Report on Patentability for PCT/JP2007/052321 issued Sep. 9, 2008.

* cited by examiner

*Primary Examiner* — Jean Gelin
*Assistant Examiner* — Quan M Hua

(57) ABSTRACT

A radio channel estimation result which is an estimation result of a state of a propagation path to a mobile terminal that is a communication target, is generated. Whether a correction operation for correcting a frequency drift of a radio frequency used in radio communication between a radio base station and the mobile terminal has converged or not is determined. Then, a moving speed of the mobile terminal is estimated using only the radio channel estimation result at the time when the correction operation has converged.

3 Claims, 1 Drawing Sheet

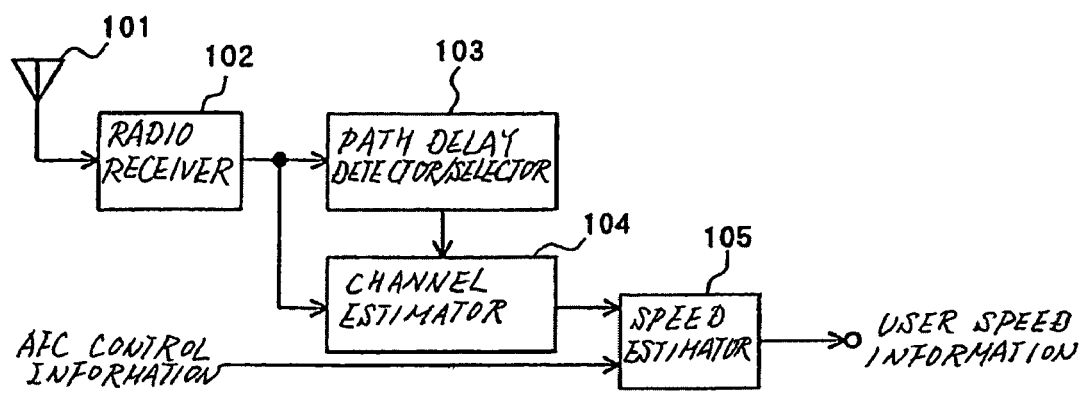

MOBILE COMMUNICATION SYSTEM AND METHOD FOR ESTIMATING MOVING SPEED OF MOBILE TERMINAL

TECHNICAL FIELD

The present invention relates to a radio base station which performs radio communication with a mobile terminal using a radio channel, and a moving speed estimation method for estimating the moving speed of a mobile terminal.

BACKGROUND ART

In a mobile communication system or the like, a mobile terminal and a radio base station perform radio communication using a radio channel. As a multiple access scheme used in a mobile communication system, for a radio base station to perform radio communication with a plurality of mobile terminals at the same time, Frequency Division Multiple Access scheme (FDMA), Time Division Multiple Access scheme (TDMA), Code Division Multiple Access scheme (CDMA), etc. have been put to practical use.

In this mobile communication system, the moving speed of a mobile terminal may be estimated because it is used for, for example, position measurement of a mobile terminal, control of downlink transmission power of a radio base station, control of uplink transmission power of a mobile terminal, control of handover of a parameter in respective radio base stations at a time when a mobile terminal moves across cells, control of the average interval of a radio channel estimation result which is an estimation result of the state of a propagation path, or the like.

Conventionally, various means for estimating the moving speed of a mobile terminal in a radio base station have been proposed. Most of them obtain a moving speed based on an auto-correlation of a radio channel estimation result as described in, for example, Japanese Patent Laid-Open No. 2003-158779 (hereinafter referred to as Patent Document 1).

However, in the related mobile communication system as described above, there is a problem that estimation accuracy of a moving speed of a mobile terminal is degraded when there is a fixed frequency drift in the frequency of a radio channel used for radio communication between a radio base station and a mobile terminal.

In the mobile communication system, when there is a fixed frequency drift in a radio frequency used for radio communication between a radio base station and a mobile terminal, the mobile communication system operates to correct the frequency drift by a known AFC (Auto Frequency Control) technology in the radio base station. In a radio channel estimation result obtained in a state where the operation for correcting the frequency drift has not converged, an error component due to the frequency drift is contained.

In the related art described in above described Patent Document 1, since the moving speed of a mobile terminal is estimated using a radio channel estimation result containing an error component, estimation accuracy of the moving speed is degraded.

SUMMARY

Thus, an exemplary object of the invention is to provide a radio base station and a method for estimating the moving speed of a mobile terminal which can prevent estimation accuracy of the moving speed of the mobile terminal from being degraded.

To achieve the above described object, according to the present invention, in a radio base station, a radio channel estimation result, which is an estimation result of a state of a propagation path to a mobile terminal that is a communication target, is generated; and whether a correction operation for correcting the frequency drift of a radio frequency used in radio communication between the radio base station and the mobile terminal has converged or not is determined. Then, the moving speed of the mobile terminal is estimated using only the radio channel estimation result at the time when the correction operation has converged.

In the above described radio base station and moving speed estimation method, whether a correction operation for correcting a frequency drift of a radio frequency has converged or not is determined, and the moving speed of the mobile terminal is estimated using only the radio channel estimation result at the time when the correction operation has converged. Accordingly, a radio channel estimation result at the time when the correction operation has not converged is not used for estimation of the moving speed of the mobile terminal.

Therefore, even if a fixed frequency drift exists between a radio base station and a mobile terminal, accuracy of estimating a moving speed of the mobile terminal by the radio base station can be prevented from being degraded.

BRIEF DESCRIPTION OF THE DRAWING

FIG. 1 is a block diagram which shows one configuration example of a radio base station included in a mobile communication system of the present invention.

EXEMPLARY EMBODIMENT

Next, an exemplary embodiment of the present invention will be described with reference to the drawing.

According to the exemplary embodiment, the moving speed of a mobile terminal is estimated using only a radio channel estimation result in a state where an operation for correcting the frequency drift of a radio frequency by AFC (Auto Frequency Control) has converged, thereby preventing the estimation accuracy of the moving speed of the mobile terminal from being degraded.

Specifically, when the moving speed of a mobile terminal is estimated from a radio channel estimation result, whether a correction operation of a frequency drift by AFC has converged or not is determined depending on whether or not the value of AFC control information satisfies a predetermined condition, using AFC control information which indicates a correction amount of the frequency drift, and only the radio channel estimation result at the time when the correction operation has converged is used for estimation of the moving speed of the mobile terminal.

Hereinafter, the method for estimating the moving speed of a mobile terminal of the exemplary embodiment will be described using an example of a mobile communication system of the CDMA scheme. The method for estimating the moving speed of a mobile terminal of the exemplary embodiment can also be applied to multiple access schemes other than a CDMA scheme.

As shown in FIG. 1, a radio base station included in the mobile communication system of the exemplary embodiment is configured to include receiving antenna 101, radio receiver 102, path delay detector/selector 103, channel estimator 104, and speed estimator 105. Path delay detector/selector 103, channel estimator 104, and speed estimator 105 are implemented by an LSI composed of logic circuitry and the like, or a processing device or the like such as a DSP (Digital Signal Processor) or a CPU which implements functions of these components according to a program.

Receiving antenna 101 receives a radio signal sent form a mobile terminal, as well as radiates a radio signal to be sent from the radio base station toward a mobile terminal. Since the exemplary embodiment is intended to propose a method for estimating the moving speed of a mobile terminal from a received signal, description of a transmitting function included in the radio base station will be omitted in the following. The number of elements and the alignment method of a receiving antenna included in receiving antenna 101 used in the exemplary embodiment may be of any known configuration, and are not limited to a specific configuration.

A user signal, an interference signal, and thermal noise which are sent from respective mobile terminals through a plurality of radio channels, are superimposed on a signal received by receiving antenna 101. In the received signal, since the received signal goes through a plurality of radio channels, there is a multipath component whose delay amount is different even if it is a same user's signal component.

Radio receiver 102 includes a low noise amplifier, a band-limiting filter, a mixer, a local oscillator, an AGC (Auto Gain Controller), a quadrature detector and low-pass filter, an analog-to-digital converter, and the like, and performs amplification of a signal received by receiving antenna 101, and frequency conversion (radio frequency to baseband signal frequency), quadrature detection, and analog-digital conversion with respect to the received signal. It performs output as a baseband signal to path delay detector/selector 103 and channel estimator 104. Radio receiver 102 used in the exemplary embodiment may be of any know configuration, and is not limited to a specific configuration.

Path delay detector/selector 103 detects timing of a multipath component of a desired user signal (a user signal of a communication target), i.e., a path delay, from an output signal of radio receiver 102. It is noted here that the method for separating a desired signal from a received signal in which a plurality of user signals are multiplexed, the method for detecting a path delay, and the number of path delays to be detected are not specifically limited, and any known method may be used. As a method for detecting a path delay, for example, there is a method for detecting a path delay using a known symbol (a pilot symbol or the like) corresponding to a desired user signal.

Path delay detector/selector 103 selects a path delay which satisfies a criterion in accordance with a preset selection criterion, from a plurality of detected path delays.

Examples of selection criteria of a path delay are (1) to (4) as follows:
(1) Top N (N is an integer number greater than or equal to 1) path delays in order of largeness of desired user signal components
(2) Top N (N is an integer number greater than or equal to 1) path delays in descending order of signal to interference ratio (SIR) of desired user signals
(3) Path delay of a desired user signal component larger than a threshold
(4) Path delay of a desired user signal whose signal to interference ratio is larger than a threshold Selection criteria of a path delay are not limited to the above described (1) to (4), and other selection criteria may be provided. Path delay information which indicates a selected path delay is outputted to channel estimator 104.

Channel estimator 104 performs radio channel estimation of the desired user signal at each path delay timing obtained from the path delay information based on the path delay information outputted from path delay detector/selector 103 and the output signal of radio receiver 102.

As a radio channel estimation method, for example, there is a method in which radio channel estimation is performed using a known symbol (a pilot symbol or the like) corresponding to a desired user signal. The radio channel estimation method is not limited to the above described method, and any known method may be used.

Channel estimator 104 outputs a radio channel estimation result of the desired user signal to speed estimator 105.

Speed estimator 105 receives, as inputs, the radio channel estimation result of the desired user signal outputted from channel estimator 104 and AFC control information, and using the AFC control information, determines whether or not to use the radio channel estimation result at this time for estimating the moving speed of a relevant user (mobile terminal).

As described above, AFC is a function of estimating a fixed frequency drift of a desired user signal based on a reference frequency held by a radio base station, and of correcting the frequency drift of the desired user signal.

Examples of AFC schemes are the following (5) to (6) schemes:
(5) A corrected frequency drift of a desired user signal is estimated using a radio channel estimation result of the desired user signal which is outputted from channel estimator 104, and the frequency drift is corrected so as to be eliminated by closed loop control. In this case, information which indicates an amount of a corrected frequency drift of a desired user signal is contained in AFC control information.
(6) A fixed frequency drift of a desired user signal is estimated using a radio channel estimation result of the desired user signal which is outputted from channel estimator 104, and the frequency drift is corrected so as to be eliminated by closed loop control. In this case, information which indicates an amount of a fixed frequency drift of a desired user signal is contained in AFC control information.

In a configuration of the above described schemes (5), (6), an AFC controller (not shown) for implementing AFC is provided, for example, on the output side of channel estimator 104, and AFC control information is outputted from the AFC controller.

Although in the above described schemes (5), (6), an example is illustrated in which AFC control information is generated based on a radio channel estimation result of a desired user signal which is outputted from channel estimator 104, a configuration may be made in which, for example, a frequency drift of a desired user signal contained in a received signal at radio receiver 102 is detected and AFC control information which indicates the amount of the frequency drift is outputted. The AFC scheme may be of any configuration if a frequency drift of a desired user signal can be detected based on a reference frequency held by a radio base station, and AFC control information for correcting the amount of the drift can be outputted.

As a method for determining whether or not to use a radio channel estimation result for estimating a moving speed by speed estimator 105, there are the following methods (7), (8):
(7) In a case where a corrected frequency drift of a desired user signal is contained in AFC control information, when the frequency drift is greater than a preset threshold value, a radio channel estimation result at this time is not used for estimation of a moving speed. If the frequency drift is less than or equal to the threshold value, the radio channel estimation result at this time is used for estimation of a moving speed. At this point, as the threshold value, a value whose size is the frequency drift plus a predetermined margin in which a correction operation of a frequency drift by AFC can be assumed to have converged, is set.

(8) In a case where a fixed frequency drift of a desired user signal is contained in AFC control information, when an amount of change of the frequency drift is greater than a preset threshold value, a radio channel estimation result at this time is not used for estimation of a moving speed. If the amount of change of the frequency drift is less than or equal to the threshold value, the radio channel estimation result at this time is used for estimation of a moving speed. At this point, as the threshold value, a value whose size is the amount of change of the frequency drift plus a predetermined margin in which a correction operation of a frequency drift by AFC can be assumed to have converged, is set.

The method for determining whether or not it is used for estimation of a moving speed is not limited to the above described (7), (8), and may be a different method.

Speed estimator 105 estimates the moving speed of a mobile terminal corresponding to a desired user signal from a radio channel result determined to be used for estimation of the moving speed, and outputs the estimation result as user speed information.

As a moving speed estimation method, there is the method for estimating a moving speed from an auto-correlation of a radio channel estimation result as described in Patent Document 1. The moving speed estimation method is not limited to the above described method, and any known method may be used.

According to the exemplary embodiment, whether a correction operation to correct a frequency drift of a radio frequency by AFC has converged or not is determined, and a moving speed of a mobile terminal is estimated using only the radio channel estimation result at a time when the correction operation has converged, and therefore a radio channel estimation result at a time when the correction operation has not converged is not used for estimation of the moving speed of the mobile terminal.

Consequently, even if a fixed frequency drift exists between a radio base station and a mobile terminal, accuracy of estimating a moving speed of the mobile terminal by the radio base station can be prevented from being degraded.

The invention claimed is:

1. A radio base station which estimates a moving speed of a mobile terminal based on (Auto Frequency Control) AFC control information available to and retrievable by and thus known to the radio base station, the radio base station comprising:
    a channel estimating device configured to
        perform estimation of a propagation path to the mobile terminal that is a communication target of the radio base station and to output said estimation; and
    a speed estimating device configured to
        perform a correction operation that is for correcting a frequency drift of a radio frequency used in radio communication between said radio base station and said mobile terminal and
        determine whether said correction operation has converged or not,
        And to estimate the moving speed of said mobile terminal using only said radio channel estimation result in response to determining that the correction operation has converged and only at a time when said correction operation has converged,
    wherein in the correction operation
        the radio base station is configured to correct the frequency drift of the radio frequency used in radio communication between said radio base station and said mobile terminal in a closed loop manner using the retrieved AFC control information indicating an amount by which the frequency drift has been corrected as a result of the performance of the correction operation,
    wherein determining whether said correction operation has converged or not comprises:
        comparing the frequency drift against a predetermined threshold value;
        determining the convergence has occurred in response to detecting the frequency drift is less than or equal to a threshold value within a first predetermined margin, or when an amount of change of the frequency drift is less than or equal to a threshold value within a second predetermined margin,
    wherein the speed estimator is configured to determine whether the correction operation has converged by examining the amount of by which the frequency drift has been corrected as contained within the AFC control information.

2. A mobile communication system, comprising:
    a radio base station according to claim 1; and
    a mobile terminal which performs radio communication with said radio base station.

3. A moving speed estimation method for estimating a moving speed of a mobile terminal by a radio base station based on (Auto Frequency Control) AFC control information available to and retrieve by and thus known to the radio base station, the method comprising:
    performing a radio channel estimation of a state of a propagation path to the mobile terminal that is a communication target, and generating a result of said estimation;
    performing a correction operation configured for correcting a frequency drift of a radio frequency used in radio communication between said radio base station and said mobile terminal and
    determining whether said correction operation has converged or not; and
    estimating the moving speed of said mobile terminal using only said radio channel
    estimation result in response to determining that the correction operation has converged and only at a time when said correction operation has converged,
    wherein in the correction operation
    the correction operation is configured to correct the frequency drift of the radio frequency used in radio communication between said radio base station and said mobile terminal in a closed loop manner using the retrieved AFC control information indicating an amount by which the frequency drift has been corrected as a result of the performance of the correction operation,
    wherein determining whether said correction operation has converged or not comprises:
    comparing the frequency drift against a predetermined threshold value;
    determining the convergence has occurred in response to detecting the frequency drift is less than or equal to a threshold value within a first predetermined margin, or when an amount of change of the frequency drift is less than or equal to a threshold value within a second predetermined margin,
    wherein determining whether the correction operation has converged is achieved by examining the amount of by which the frequency drift has been corrected as contained within the AFC control information.

* * * * *